US010057490B2

(12) United States Patent
Shin et al.

(10) Patent No.: US 10,057,490 B2
(45) Date of Patent: Aug. 21, 2018

(54) IMAGE CAPTURE APPARATUS AND REMOTE CONTROL THEREOF

(71) Applicant: SAMSUNG ELECTRONICS CO., LTD., Gyeonggi-do (KR)

(72) Inventors: Sang-ho Shin, Seoul (KR);
Seung-dong Yu, Osan-si (KR);
Woo-yong Chang, Yongin-si (KR);
Se-jun Park, Yongin-si (KR);
Min-jeong Moon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/908,784

(22) Filed: Jun. 3, 2013

(65) Prior Publication Data
US 2013/0265452 A1 Oct. 10, 2013

Related U.S. Application Data

(62) Division of application No. 12/946,408, filed on Nov. 15, 2010.

(30) Foreign Application Priority Data

Nov. 13, 2009 (KR) .......................... 10-2009-0109545
Nov. 9, 2010 (KR) .......................... 10-2010-0110959

(51) Int. Cl.
*H04N 5/232* (2006.01)
(52) U.S. Cl.
CPC ......... *H04N 5/23245* (2013.01); *H04N 5/232* (2013.01); *H04N 5/23203* (2013.01)

(58) Field of Classification Search
CPC ...................................................... H04N 5/232
See application file for complete search history.

(56) References Cited

U.S. PATENT DOCUMENTS 6,172,605 B1 1/2001 Matsumoto et al.
6,809,759 B1 * 10/2004 Chiang .............. H04N 5/23293
348/211.2
(Continued)

FOREIGN PATENT DOCUMENTS

CN 1554193 A 12/2004
CN 1578416 A 2/2005
(Continued)

OTHER PUBLICATIONS

Go Soho;Remote Control System With Image Display, and Its Using Method; Jan. 12, 2006; JP 2006013881.*
(Continued)

*Primary Examiner* — Md Haque
(74) *Attorney, Agent, or Firm* — Sughrue Mion, PLLC

(57) ABSTRACT

A method of providing an image of an image capture apparatus, the method including executing an application for a remote device to remotely control the image capture apparatus to successively capture a sequence of video frames, receiving from the remote device a first input instructing the image capture apparatus to successively capture the sequence of video frames, successively capturing the sequence of video frames and streaming the sequence of video frames to the remote device, in response to receiving the first input, receiving from the remote device a second input instructing the image capture apparatus to capture a still image, and providing the still image, in response to receiving the second input.

27 Claims, 11 Drawing Sheets

(56) References Cited

U.S. PATENT DOCUMENTS

| | | | |
|---|---|---|---|
| 8,194,152 B2 * | 6/2012 | Pinto | H04N 5/235 348/228.1 |
| 2002/0057348 A1 | 5/2002 | Miura et al. | |
| 2003/0071914 A1 * | 4/2003 | Wei | H04N 5/232 348/375 |
| 2003/0083048 A1 | 5/2003 | Robinson et al. | |
| 2003/0160873 A1 * | 8/2003 | Tecu | H04N 5/23225 348/211.2 |
| 2004/0070679 A1 * | 4/2004 | Pope | H04N 1/2112 348/231.99 |
| 2004/0155967 A1 * | 8/2004 | Belz | H04N 5/23293 348/207.99 |
| 2004/0239765 A1 | 12/2004 | Kuromatsu | |
| 2005/0036036 A1 | 2/2005 | Stevenson et al. | |
| 2006/0232671 A1 | 10/2006 | Yasunaga et al. | |
| 2006/0262365 A1 * | 11/2006 | Imao | H04N 5/232 358/527 |
| 2006/0263066 A1 * | 11/2006 | Matsumoto | H04N 5/232 386/224 |
| 2006/0268122 A1 * | 11/2006 | Iwasaki | H04N 1/32037 348/231.3 |
| 2006/0290785 A1 * | 12/2006 | Chen | H04N 5/23296 348/211.99 |
| 2007/0025711 A1 | 2/2007 | Marcus | |
| 2007/0036518 A1 * | 2/2007 | Jeong | H04N 5/783 386/329 |
| 2007/0109417 A1 * | 5/2007 | Hyttfors | H04N 5/232 348/211.99 |
| 2007/0153713 A1 * | 7/2007 | Anttila | H04H 20/24 370/270 |
| 2008/0015415 A1 * | 1/2008 | Obata et al. | 600/118 |
| 2008/0152310 A1 * | 6/2008 | Miyagoshi | H04N 5/4401 386/328 |
| 2008/0198039 A1 * | 8/2008 | Philiben | 340/961 |
| 2008/0240697 A1 | 10/2008 | Marcus | |
| 2010/0053370 A1 * | 3/2010 | Crisan | H04N 5/235 348/231.2 |

FOREIGN PATENT DOCUMENTS

| | | |
|---|---|---|
| EP | 1 307 043 | 5/2003 |
| EP | 1725021 A2 | 11/2006 |
| JP | 9-113988 A | 5/1997 |
| JP | 11-261875 | 9/1999 |
| JP | 2000-23015 A | 1/2000 |
| JP | 2001-103359 A | 4/2001 |
| JP | 2003-244516 A | 8/2003 |
| JP | 2004-096165 | 3/2004 |
| JP | 2004-96166 A | 3/2004 |
| JP | 2004096165 * | 9/2004 |
| JP | 2004-356986 A | 12/2004 |
| JP | 2006-013881 | 1/2006 |
| JP | 2006-135587 A | 5/2006 |
| JP | 2006-166408 A | 6/2006 |
| JP | 2006-325150 A | 11/2006 |
| JP | 2007-173992 A | 7/2007 |
| JP | 2008-199460 | 8/2008 |
| KR | 1020050041673 | 5/2005 |

OTHER PUBLICATIONS

Communication from the European Patent Office dated Aug. 5, 2013 in counterpart European Application No. 10191064.4.
Communication dated Oct. 6, 2014, issued by the European Patent Office in counterpart European Application No. 10191064.4.
Communication dated Jun. 4, 2014, issued by the State Intellectual Property Office of the People's Republic of China in counterpart Chinese Application No. 201010549878.2.
Communication dated Aug. 12, 2014, issued by the Japanese Patent Office in counterpart Japanese Application No. 2010-253673.
Communication dated Mar. 2, 2015 by the State Intellectual Property Office of PR of China in related Application No. 2010105498782.
Communication dated Jun. 1, 2015 issued by the Japanese Patent Office in counterpart Japanese Patent Application No. 2010-253673.
Communication dated Apr. 6, 2016, issued by the State Intellectual Property Office of P.R. China in counterpart Chinese Application No. 201010549878.2.
Communication dated Sep. 28, 2015, issued by the State Intellectual Property Office of the People's Republic of China in counterpart Chinese Application No. 201010549878.2.
Communication dated Sep. 12, 2016, issued by Japanese Patent Office in counterpart Japanese Application No. 2015-195752.
Communication dated Nov. 8, 2016, issued by The State Intellectual Property Office of P.R. China in counterpart Chinese Patent Application No. 201010549878.2.
Communication dated Jan. 9, 2017, issued by the Korean Intellectual Property Office in counterpart Korean Patent Application No. 10-2010-0110959.
Communication dated Mar. 27, 2017, issued by the Japanese Patent Office in counterpart Japanese Patent Application No. 2015-195752.
Communication dated Jul. 4, 2017, issued by the State Intellectual Property Office of P.R. China in counterpart Chinese Application No. 201510319538.3.
Communication dated Sep. 8, 2017, issued by the State Intellectual Property Office of P.R. China in counterpart Chinese Application No. 201010549878.2.
Communication dated Mar. 27, 2016, issued by the State Intellectual Property Office of P.R. China in counterpart Chinese Application No. 201010549878.2.
Communication dated Jul. 6, 2016, issued by the Korean Intellectual Property Office in counterpart Korean Patent Application No. 10-2010-0110959.
Communication dated Apr. 17, 2018, issued by the State Intellectual Property Office of the People's Republic of China in counterpart Chinese Patent Application No. 201510319538.3.

* cited by examiner

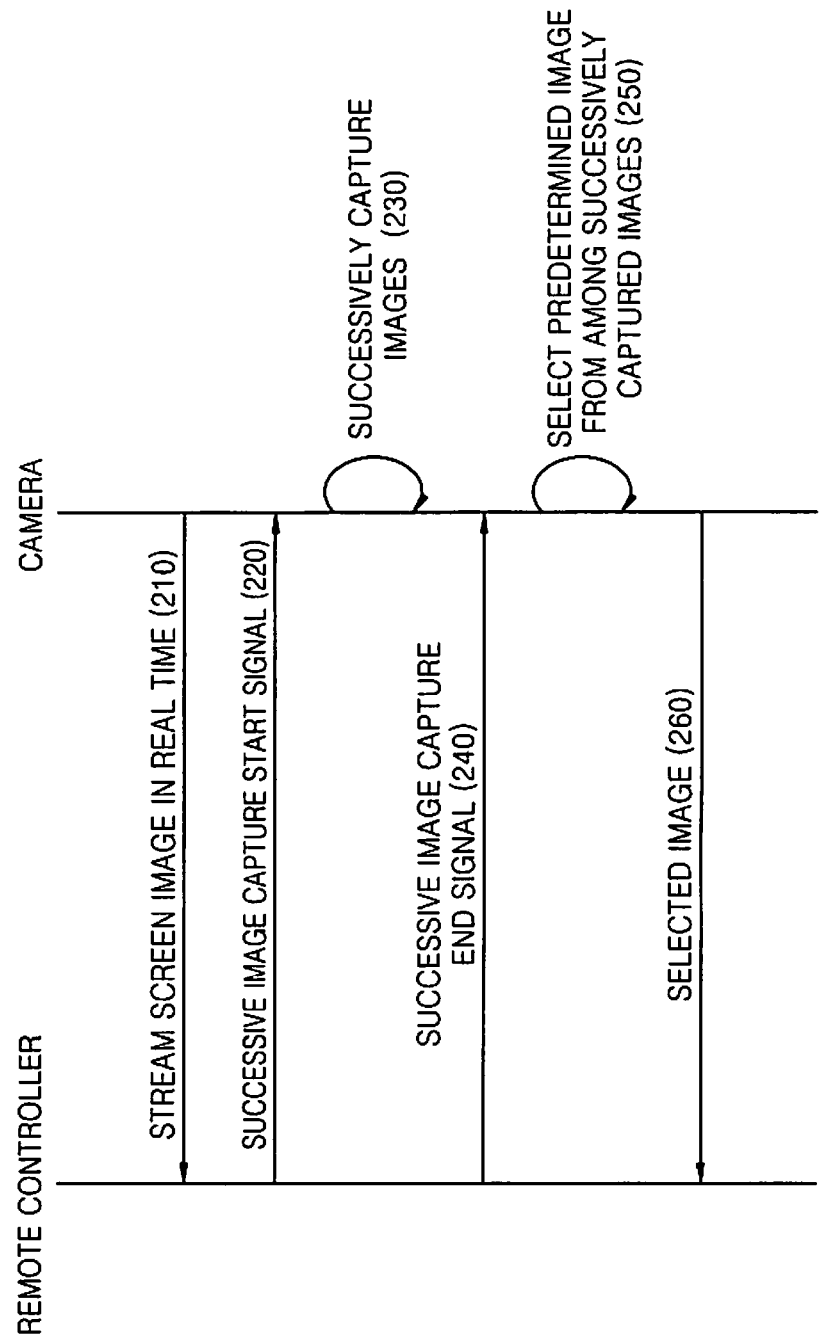

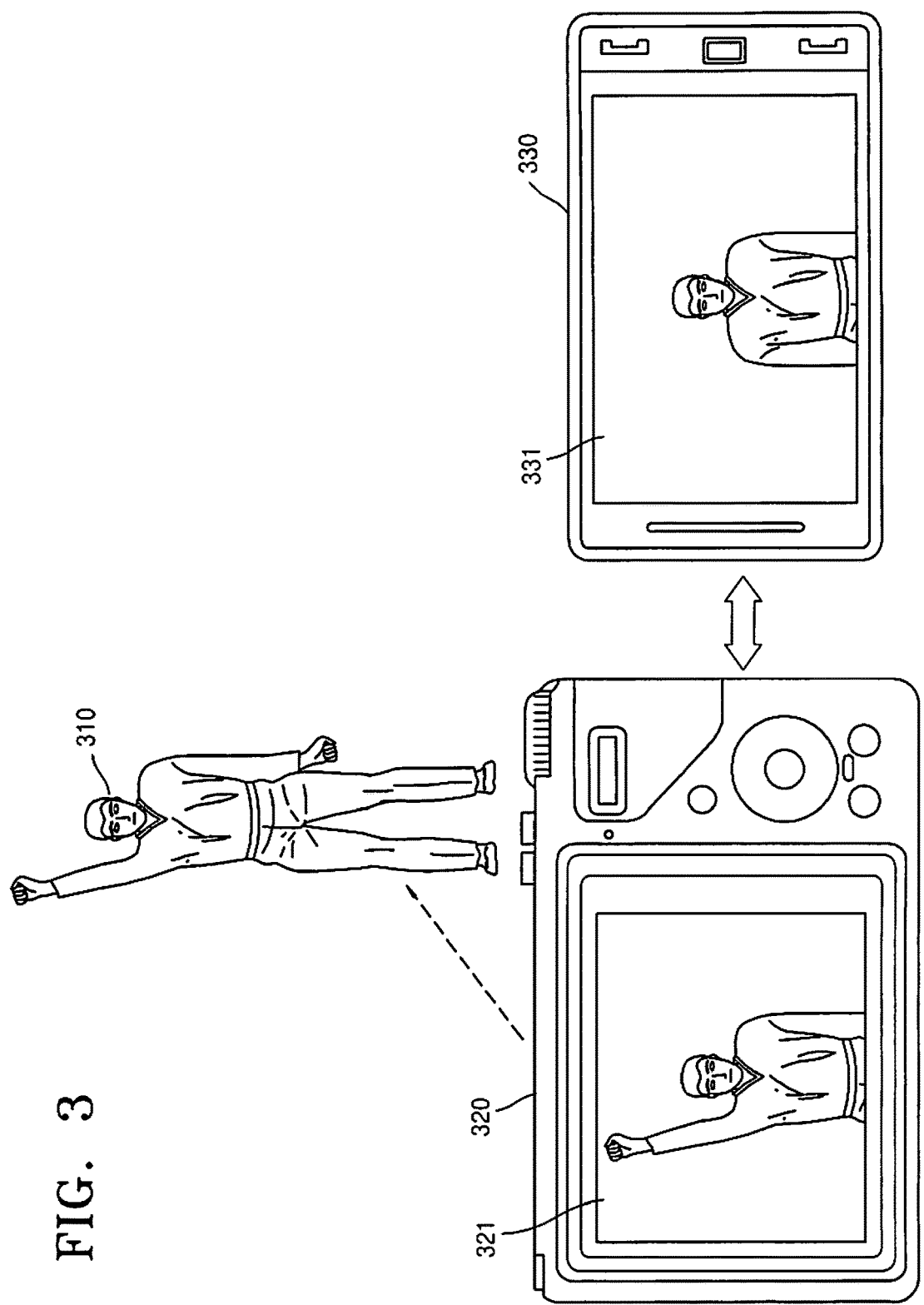

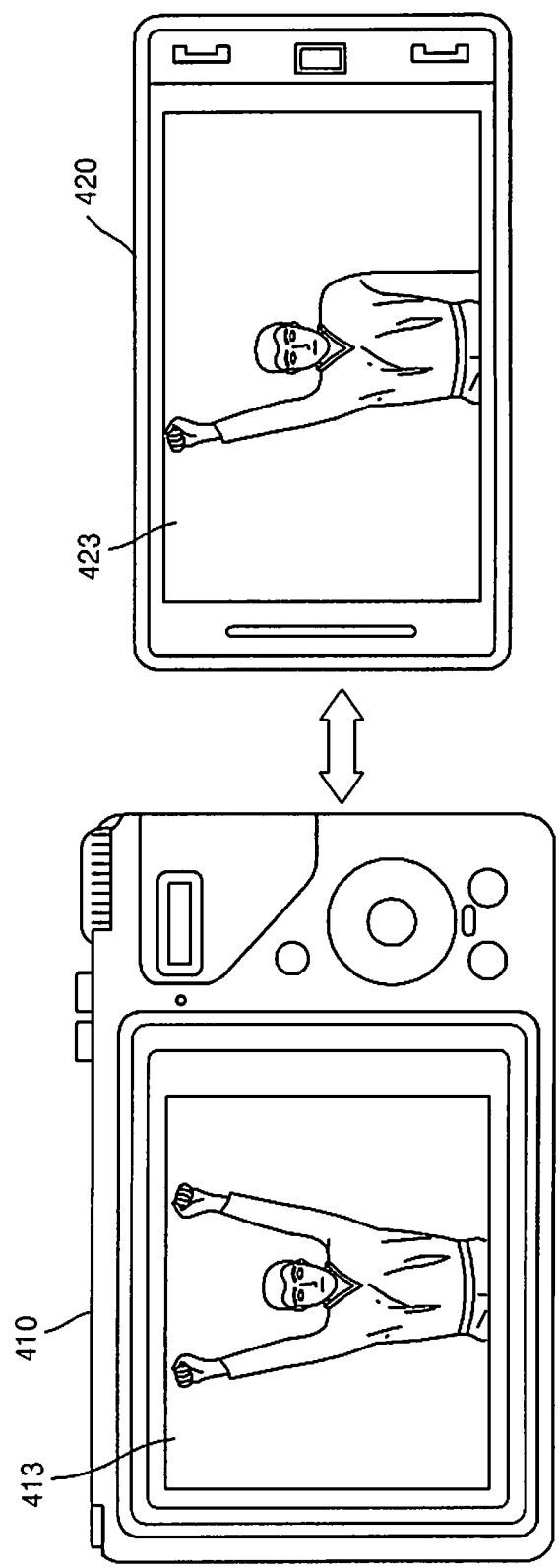

IMAGE CAPTURE APPARATUS AND REMOTE CONTROL THEREOF

CROSS-REFERENCE TO RELATED APPLICATIONS

This application is a divisional application of U.S. application Ser. No. 12/946,408,filed on Nov. 15, 2010,in the U.S. Patent and Trademark Office, which claims priority to Korean Patent Application No. 10-2009-0109545,which was filed in the Korean Intellectual Property Office, on Nov. 13, 2009,and Korean Patent Application No. 10-2010-0110959, which was filed in the Korean Intellectual Property Office, on Nov. 9, 2010,the disclosures of which are incorporated herein by reference in their entireties.

BACKGROUND OF THE INVENTION

1. Field of the Invention

The present invention generally relates to remotely controlling a camera, and more particularly to a method and an apparatus for providing an image in a camera or a remote controller of a camera.

2. Description of the Related Art

A digital camera is a device for converting a still image or a moving image to digital signals and storing the digital signals in a storage medium, such as a memory card. An image of an object captured via a lens is converted to electric signals by a Charge-Coupled Device (CCD) or a Complementary Metal-Oxide Semiconductor (CMOS). The electric signals are converted to digital signals by an Analog-to-Digital (ND) converter, and the digital signals are stored in a memory after correction and compression. The stored digital signals are transmitted to a Personal Computer (PC) or a recording medium via any of various interfaces. Accordingly, a digital image is formed.

An object is photographed by using a digital camera by directing a lens of the digital camera toward the object, focusing the digital camera to capture an optimal image, and triggering a shutter. The series of operations is applicable when a person operating a digital camera and a person to be photographed are different people. When a person operating a digital camera and another person shall be photographed together, a timer function of a digital camera is generally used. However, it is difficult to obtain a desired angle and focus by using a timer function, and thus it is difficult to obtain a clear image. Therefore, a remote controller for remotely controlling a digital camera is used.

SUMMARY OF THE INVENTION

Accordingly, the present invention provides a method and an apparatus for providing an image in a camera or a remote controller of a camera to acquire a captured image with no time delay.

According to an aspect of the present invention, a method of providing an image includes transmitting an image capture start signal to a camera; transmitting an image capture end signal to the camera; and receiving an image captured at a time which is a predetermined period of time prior to a time at which the image capture end signal is received.

According to another aspect of the present invention, a method of providing an image includes receiving an image capture start signal from a remote controller of the camera; successively capturing images after the image capture start signal is received; receiving an image capture end signal from the remote controller; and selecting an image captured at a time which is a predetermined period of time prior to a time at which the image capture end signal is received.

According to another aspect of the present invention, a method of providing an image includes transmitting first image capture signal to a camera; transmitting second image capture signal to the camera; and receiving a JPEG image captured at a time which is a predetermined period of time prior to a time at which the successive image capture end signal is received.

According to another aspect of the present invention, a method of transmitting an image includes receiving first image capture signal from a remote controller of a camera; encoding an image displayed on the camera by using a motion JPEG encoding method and transmitting the encoded image to the remote controller; receiving second image capture signal from the remote controller; and selecting a JPEG image captured at a time which is a predetermined period of time prior to a time at which the second image capture signal is received.

According to another aspect of the present invention, a method of providing an image includes transmitting a motion picture capture start signal to a camera; receiving a real time stream of a motion picture captured by the camera; transmitting a still image capture signal to the camera; and receiving an image file generated by converting a frame corresponding to a time which is a predetermined period of time prior to a time, at which the still image capture signal is received, extracted from the captured motion picture.

According to another aspect of the present invention, a method of transmitting an image includes receiving a motion picture capture start signal from a remote controller; capturing a motion picture; streaming the captured motion picture to the remote controller in real time; receiving a still image capture signal from the remote controller; and extracting a frame corresponding to a time which is a predetermined period of time prior to a time, at which the still image capture signal is received, from the captured motion picture and converting the frame to an image file.

According to another aspect of the present invention, a remote controller of a camera includes a transmitting unit, which transmits an image capture start signal to a camera, and then transmits an image capture end signal to the camera; and a receiving unit, which receives an image captured at a time a predetermined period of time prior to a time at which the image capture end signal is received.

According to another aspect of the present invention, a camera includes a receiving unit, which receives an image capture start signal and an image capture end signal from a remote controller of the camera; an image capturing unit, which successively captures images after the image capture start signal is received until the image capture end signal is received; and a control unit, which selects an image captured at a time which is a predetermined period of time prior to a time at which the image capture end signal is received.

According to another aspect of the present invention, a remote controller of a camera, the remote controller includes a transmitting unit, which transmits a first image capture signal to the camera and transmits a second image capture signal to the camera; receiving a JPEG image captured at a time which is a predetermined period of time prior to a time at which the second image capture signal is received.

According to another aspect of the present invention, a camera includes a receiving unit, which receives a first image capture signal and a second image capture signal from a remote controller of a camera; and a control unit, which encodes an image displayed on the camera by using a motion JPEG encoding method and transmitting the encoded image to the remote controller and, when a second image capture signal is received from the remote controller, selects a JPEG image captured at a time which is a predetermined period of time prior to a time at which the second image capture signal is received.

According to another aspect of the present invention, a remote controller of a camera, the remote controller includes a transmitting unit, which transmits a motion picture capture start signal to a camera; and a receiving unit, which receives a real time stream of a motion picture captured by the camera and receives an image file generated by converting a frame corresponding to a time which is a predetermined period of time prior to a time, at which the still image capture signal is received, extracted from the captured motion picture.

According to another aspect of the present invention, a camera includes a receiving unit, which receives a motion picture capture start signal and a still image capture signal from a remote controller of the camera; an image capturing unit, which captures a motion picture when the motion picture capture start signal is received from the remote controller; a control unit, which, when the still image capture signal is received, extracts a frame corresponding to a time which is a predetermined period of time prior to a time, at which the still image capture signal is received, from the captured motion picture and converts the frame to an image file.

BRIEF DESCRIPTION OF THE DRAWINGS

The above and other features and advantages of the present invention will become more apparent, by describing in detail embodiments thereof, with reference to the attached drawings in which:

FIG. 2 is a diagram showing a method of remotely controlling a camera, according to an embodiment of the present invention.

FIG. 3 is a diagram showing an example of screen images displayed on the camera and the remote controller.

FIGS. 4A through 4D are diagrams showing examples of methods of remotely controlling a camera, according to an embodiment of the present invention.

DETAILED DESCRIPTION OF EMBODIMENTS OF THE INVENTION

Figure 1A:
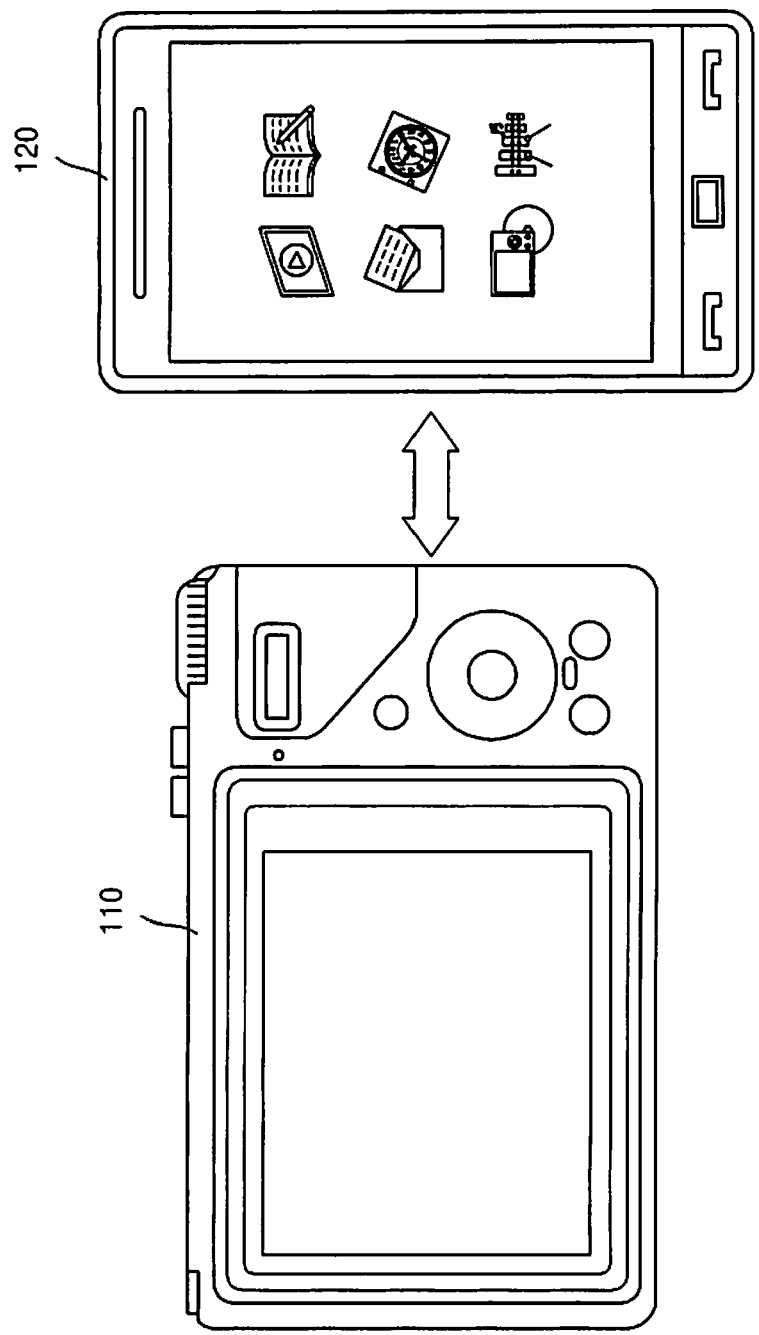
FIGS. 1A through 1E are diagrams showing examples of methods of remotely controlling a camera, according to an embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

FIGS. 1A through 1E are diagrams showing methods of remotely controlling a camera, according to an embodiment of the present invention.

Figure 1B:
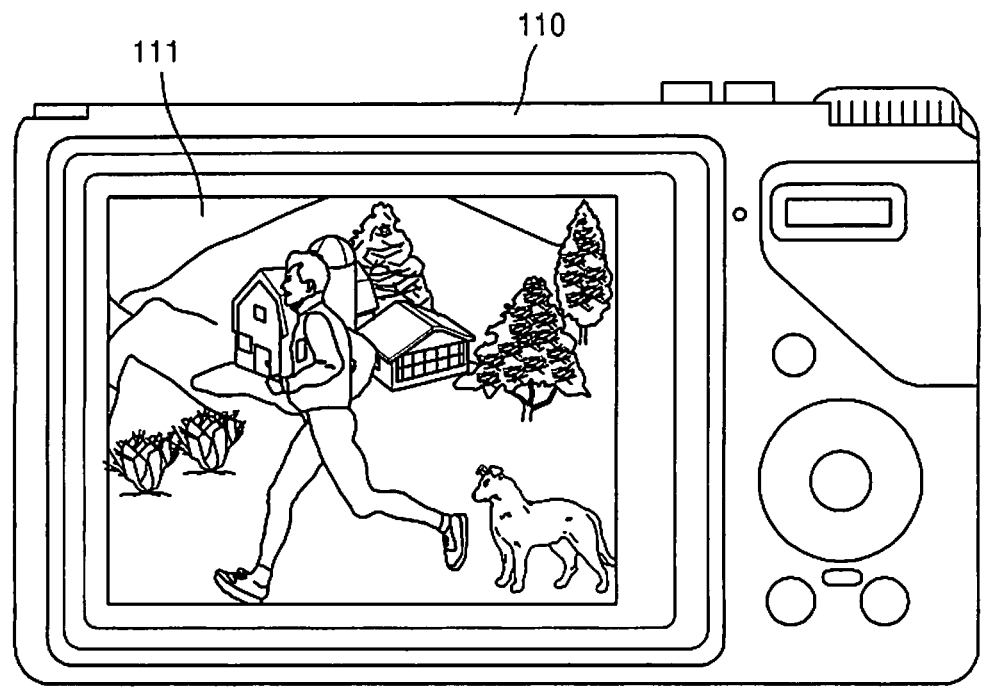
Figure 1C:
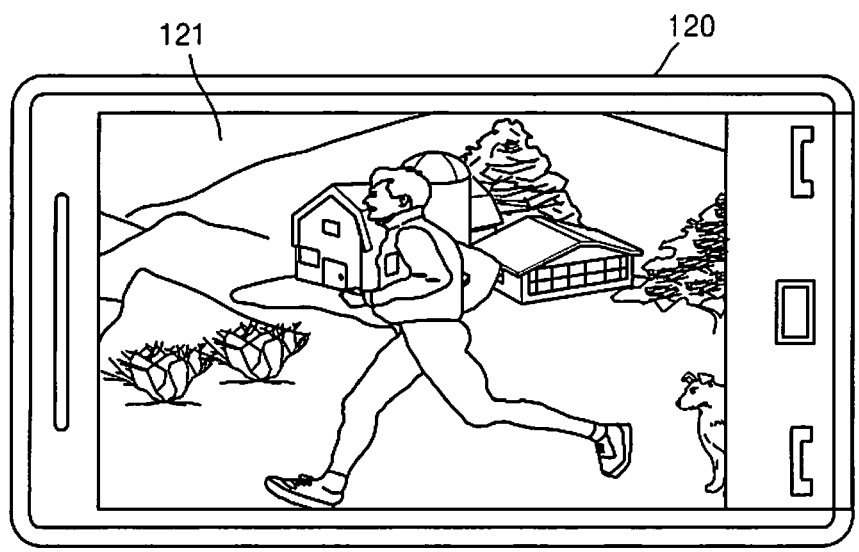
Figure 1D:
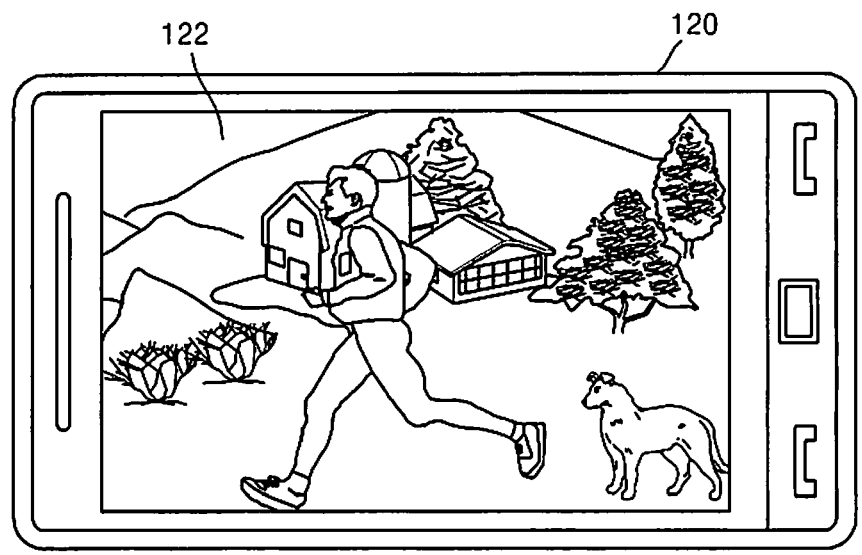
Figure 1E:
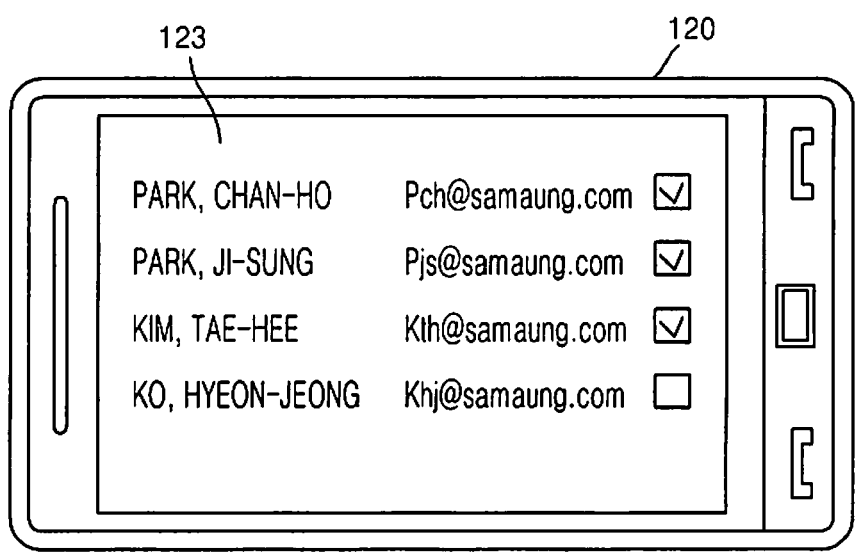

Referring to FIG. 1A, a camera 110 and a mobile device 120, which is a remote controller of the camera 110, are connected to each other via a predetermined wired or wireless communication network, such as Wi-Fi. Referring to FIG. 1B, an image 111, which is formed of electric signals converted from a light input via a lens of the camera 110, is displayed on a display unit of the camera 110. Referring to FIG. 1C, when the mobile device 120 executes an application for remotely controlling the camera 110, a screen image displayed on the camera 110 is streamed to and is displayed on a display unit of the mobile device 120 in real time. However, due to a hardware difference, such as a difference between a resolution of the display unit of the camera 110 and a resolution of the display unit of the mobile device 120, screen images displayed on each of the display units may not be identical to each other. In FIG. 1C, a screen image 121 displayed on the display unit of the mobile device 120 is smaller than a screen image 111 displayed on the display unit of the camera 110. In other words, the screen image 121 displayed on the display unit of the mobile device 120 is partially cut as compared to the screen image 111 displayed on the display unit of the camera 110. Referring to FIG. 1D, the layout of the screen image 122 may be corrected by a zoom function with respect to a screen image 122 displayed on the display unit of the mobile device 120. The size of the screen image 122 may be adjusted by using the zoom function. In FIG. 1D, the screen image 122 displayed on the display unit of the mobile device 120 becomes identical to the screen image 111 displayed on the display unit of the camera 110 by using the zoom function. Here, a user may remote-photograph an object by using a predetermined button of the mobile device 120. An image captured by the camera 110 is received by the mobile device 120, and the image is displayed. A user of the mobile device 120 may either store or delete the received image. Referring to FIG. 1E, when a received image is displayed on the mobile device 120, if a user pushes a predetermined button for sharing the image, an address book stored in the mobile device 120 is displayed on a display screen 123 of the mobile device 120. Names and e-mail addresses of people is included in the address book. Next, when the user selects addresses of people to send the image, the mobile device 120 transmits the received image to the selected addresses.

FIG. 2 is a diagram showing a method of remotely controlling a camera, according to an embodiment of the present invention.

In step 210, the camera displays an image of an object on a display unit via a live-view feature. The live-view feature refers to a function of displaying an image input via a lens on a display unit, e.g., an LCD window. The camera encodes the screen image displayed on the display unit by using a predetermined encoding method, and then streams the encoded screen image to a remote controller in real time. The remote controller decodes the screen image, which is streamed in real time, by using a predetermined decoding method, and then displays the decoded screen image on a display unit. In this case, a time delay occurs, due to the encoding operation in the camera, transmission from the camera to the remote controller, and the decoding operation in the remote controller. Therefore, a screen image displayed on the camera and a screen image displayed on the remote controller are not exactly the same. In other words, a screen image displayed on the remote controller becomes a past screen image with respect to a screen image displayed on the camera, due to a sum of the time delays stated above. For example, if a user captures an image based on a screen image displayed on the remote controller, the captured image corresponds to a screen image a time displayed a time delay after the screen image viewed by the user. In this case, a user may not be able to acquire an image of a desired screen image. Detailed description thereof will be given below with reference to FIG. 3.

FIG. 3 is a diagram showing an example of screen images displayed on the camera and the remote controller.

Referring to FIG. 3, in step 210, an image of a current object 310 input via a lens of a camera 320 is displayed. The camera 320 streams a displayed screen image 321 to a remote controller, e.g., a mobile device 330, in real time. In this case, the camera 320 encodes the displayed screen image 321 by using a predetermined encoding method and transmits the encoded screen image 321, whereas the mobile device 330 decodes received stream signals by using a predetermined decoding method and displays the decoded stream signals. Here, a time delay occurs, due to the encoding operation, the transmission, and the decoding operation. Therefore, a screen image 331 displayed on the mobile device 330 becomes a past screen image with respect to the screen image 321 displayed on the camera 320.

In step 220, if a user pushes an image capture button of the remote controller while the user is viewing a screen image displayed on the remote controller, the remote controller transmits a successive image capture start signal to the camera.

In step 230, when the camera receives the successive image capture start signal from the remote controller, the camera successively captures images at a predetermined interval. The successive image capture is a function of successively capturing images when a shutter button is pushed. A speed of successively capturing images may vary according to performance of the camera. According to an embodiment of the present invention, a time interval for successively capturing images may be smaller than a sum of time delays. Successively captured images respectively include information regarding time points at which the images are captured. The camera stores at least one of successively captured image in a predetermined storage unit of the camera.

In step 240, the remote controller transmits a successive image capture end signal to the camera. According to an embodiment of the present invention, when a user pushes a shutter button of the remote controller, the remote controller generates a successive image capture start signal. When a user holds and releases the shutter button of the remote controller, the remote controller generates a successive image capture end signal and transmits the successive image capture end signal to the camera.

In step 250, the camera, which has received the successive image capture end signal, terminates the operation of successively capturing images and selects a predetermined image to be stored from among successively captured images. The camera selects an image captured at a time, which is calculated by subtracting a sum of time delays from a time at which the camera has received the successive image capture end signal. In this case, an image identical to a screen image desired by a user may be acquired. If no image is captured at a desired time, which is calculated by subtracting a sum of time delays from a time at which the camera has received the successive image capture end signal, an image captured at a nearest time is selected as an image to be stored. Furthermore, the camera may select a plurality of images captured within a predetermined time interval from the desired time as images to be stored. The camera may store all of successively captured images, so that a user may select images to store. A sum of time delays corresponds to a sum of a period of time elapsed for encoding operation in the camera, a period of time elapsed for streaming a screen image from the camera to the remote controller, a period of time elapsed for decoding operation in the remote controller, and a period of time elapsed for transmitting a signal from the remote controller to the camera.

In step 260, the camera transmits a selected image to the remote controller. The camera may transmit a selected image via e-mail based on information in an address book stored in the camera. Furthermore, since the camera includes a face detection/recognition module, if a captured image is a portrait picture, information of a person photographed in the captured image may be detected. In this case, the camera may transmit a selected image to a person corresponding to the information detected in the image via e-mail based on information in the address book. If no address is stored in the camera, the camera may request address information to the remote controller (e.g., a mobile device), receive the address information, and transmit the selected image via e-mail based on the address information.

Furthermore, if the remote controller receives a selected image, the remote controller may also transmit the received image via e-mail based on an address in an address book stored in the remote controller. If the remote controller includes a face detection/recognition module, the remote controller may transmit the received image to a person corresponding to the information detected in the image as described above via e-mail based on the address information in the address book.

The above method will be described below with reference to FIGS. 4A through 4D. FIGS. 4A through 4D are diagrams showing examples of methods of remotely controlling a camera, according to an embodiment of the present invention.

Figure 4A:
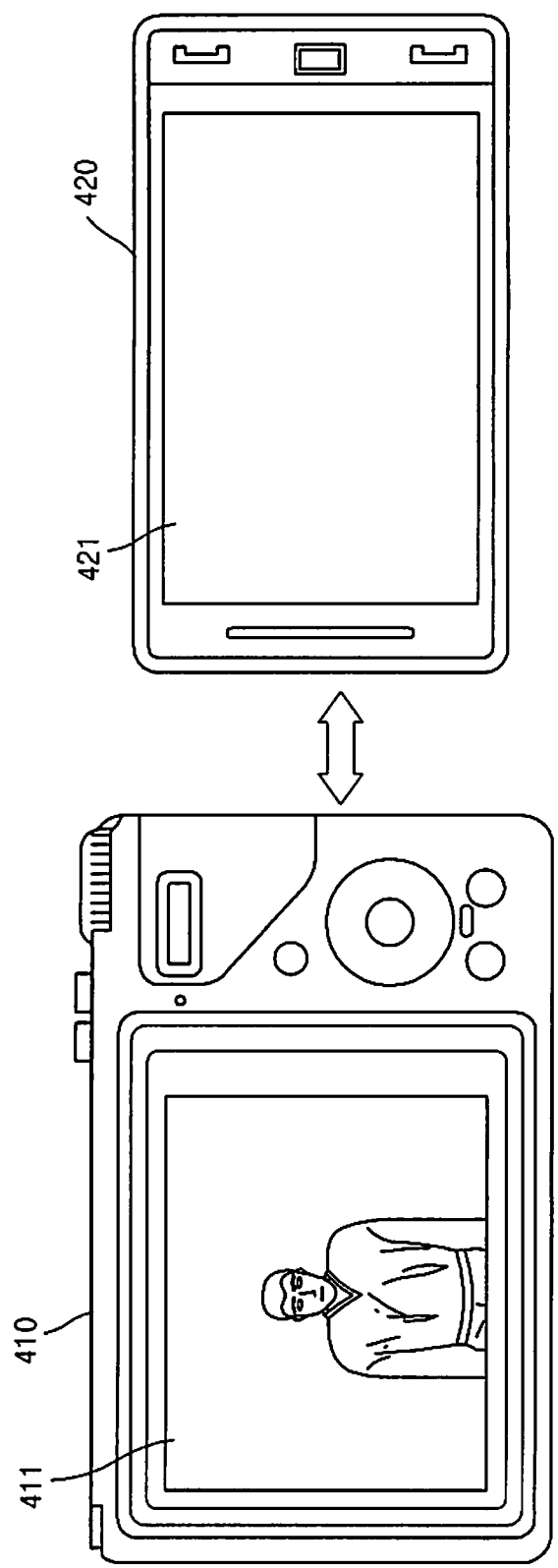
Figure 4B:
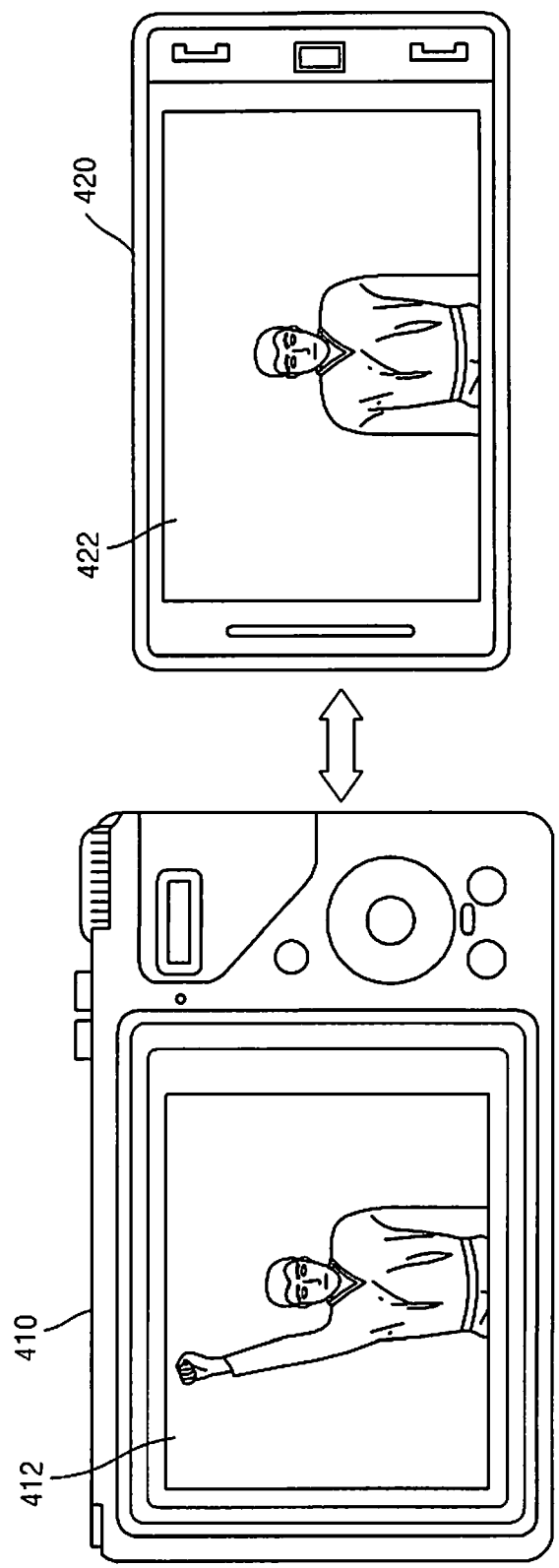
Figure 4D:
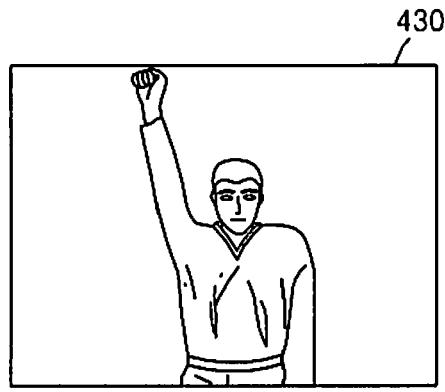

In FIG. 4A, an image 411 of an object is displayed on the camera 410. Furthermore, the camera 410 streams the image 411 to a remote controller, e.g., a mobile device 420, in real time. The image 421 streamed in real time is displayed on the remote controller 420. However, the image 421 displayed on the mobile device 420 is not identical to the image 411 displayed on the camera 410. Here, as compared to the image 411 displayed on the camera 410, the image 421 is an image delayed by a sum of a period of time elapsed for the camera 410 to encode the image 411, a period of time elapsed for the camera to transmit encoded stream signals to the mobile device 420, and a period of time elapsed for the mobile device 420 to decode the encoded stream signals. The image 421 displayed on the mobile device 420 shown in FIG. 4A is a blank image due to time delay. In the same regard, as shown in FIG. 4B, an image 412 displayed on the camera 410 and an image 422 displayed on the mobile device 420 are different from each other by a sum of time delays. Compared to FIG. 4B, FIG. 4C shows an image after a sum of time delays. In FIG. 4C, since a desired scene is found in an image 423 displayed on the mobile device 420, a user transmits a successive image capture end signal 413 to the camera 410. The camera 410, which has received the successive image capture end signal, selects an image captured prior to the time delays and transmits the selected image to the mobile device 420. In this case, the camera 410 transmits a captured image corresponding to a scene image prior to the time delays, that is, an image 430 as shown in FIG. 4D to the mobile device 420.

Furthermore, according to an embodiment of the present invention, when a successive image capture start signal is received, an image currently displayed on a display unit of a camera may be encoded to an image of a lower resolution and the encoded image may be transmitted to a remote controller. In this case, the time delay, due to encoding operation in the camera, transmission, and a decoding operation in the remote controller, may be reduced.

Figure 5:
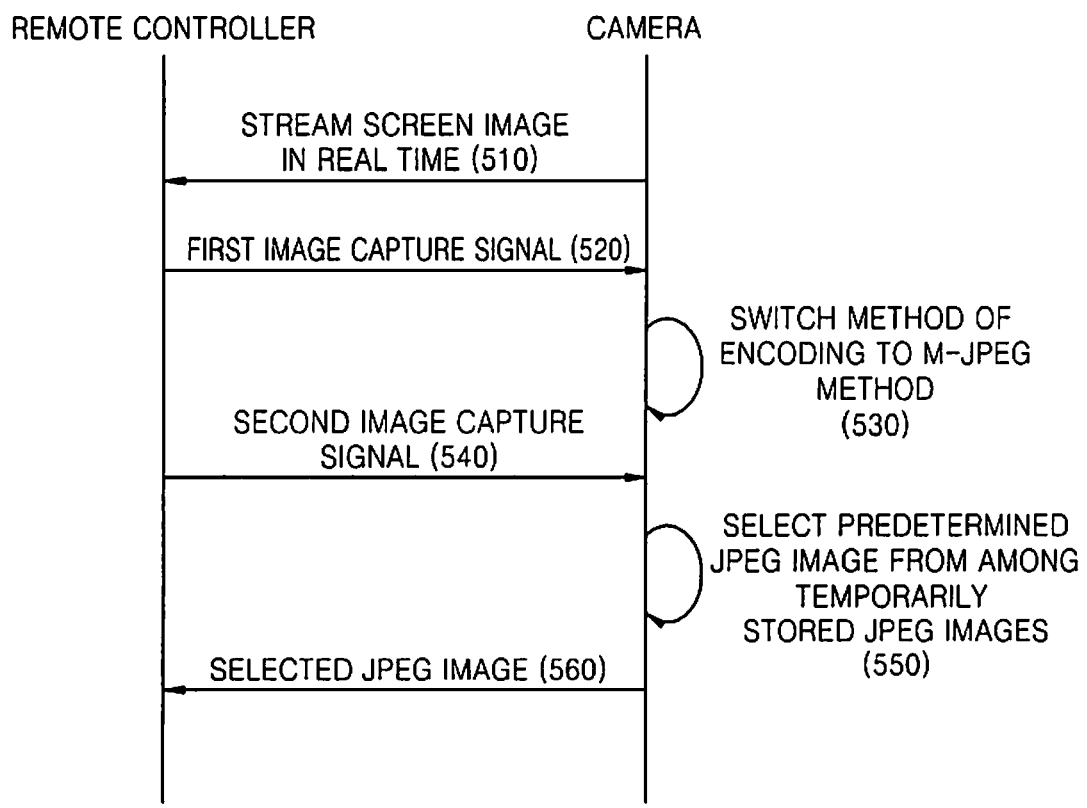
FIG. 5 is a diagram showing a method of remotely controlling a camera, according to another embodiment of the present invention.

FIG. 5 is a diagram showing a method of remotely controlling a camera, according to another embodiment of the present invention.

In step 510, an image displayed on the camera via live-view function is streamed in real time.

In step 520, if a user pushes an image capture button of the remote controller while the user is viewing a screen image displayed on the remote controller, the remote controller transmits a first image capture signal to the camera.

In step 530, when the camera receives the first image capture signal from the remote controller, a method of encoding an image displayed on a display unit of the camera via live-view function is switched to a Motion JPEG (M-JPEG) encoding method. The M-JPEG encoding method encodes each of frames to JPEG, and is an image compression technique developed from the JPEG compression method, which is a compression method for a still image. During M-JPEG compression, each of frames constituting an image is encoded to JPEG and is successively arranged to form a motion picture. A JPEG image is stored in a temporary memory.

In step 540, the remote controller transmits a second image capture signal to the camera.

In step 550, the camera, which has received the second image capture signal, selects a predetermined JPEG image from among stored JPEG images. The camera selects a JPEG image captured at a time, which is calculated by subtracting a sum of time delays from a time at which the camera has received the second image capture signal. A sum of time delays corresponds to a sum of a period of time elapsed for M-JPEG encoding operation in the camera, a period of time elapsed for streaming the encoded M-JPEG from the camera to the remote controller, a period of time elapsed for M-JPEG decoding operation in the remote controller, and a period of time elapsed for transmitting the second image capture signal from the remote controller to the camera.

In step 560, the camera transmits the selected JPEG image to the remote controller. JPEG images selected by the camera or the remote controller are transmitted via e-mail as described above in FIG. 2.

Figure 6:
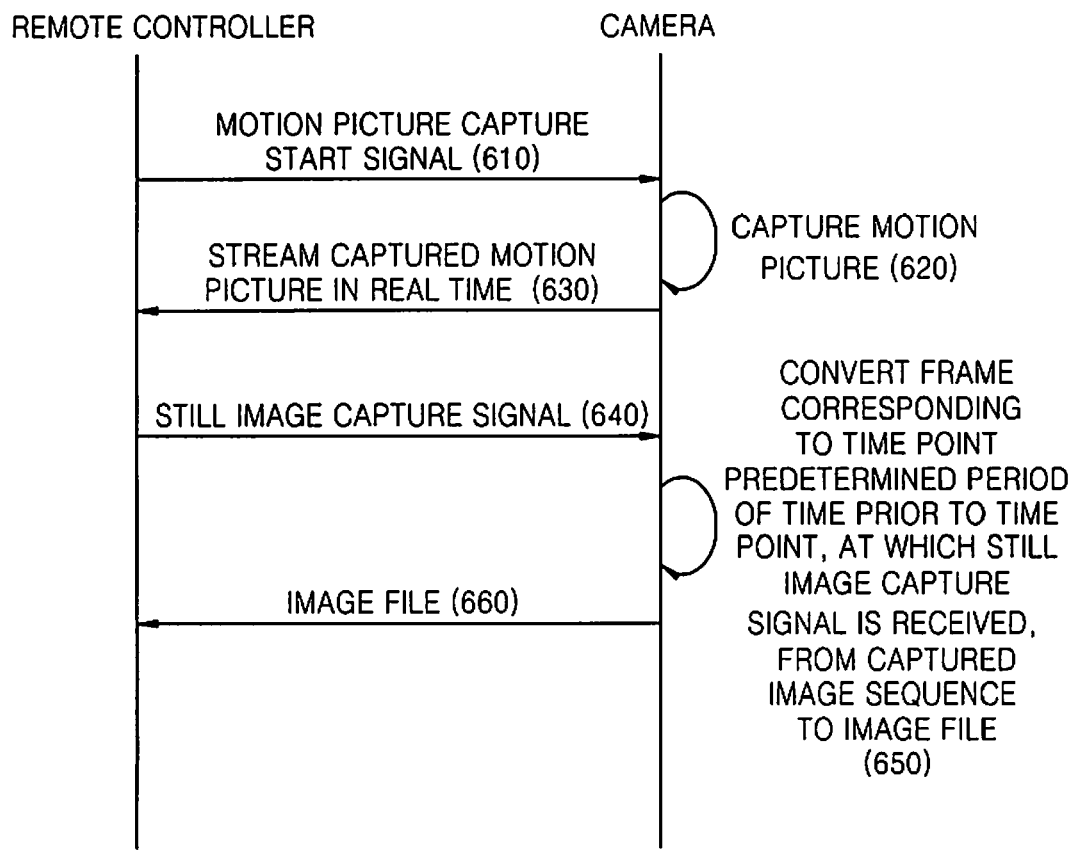
FIG. 6 is a diagram showing a method of remotely controlling a camera, according to another embodiment of the present invention.

FIG. 6 is a diagram showing a method of remotely controlling a camera, according to another embodiment of the present invention.

In step 610, a remote controller transmits a motion picture capture start signal to the camera.

In step 620, after the motion picture capture start signal is received, the camera starts capturing a motion picture. In step 630, the camera transmits captured motion picture signals to the remote controller.

In step 640, while the camera is capturing a motion picture, the remote controller transmits a still image capture signal.

In step 650, the camera extracts a frame corresponding to a time which is a predetermined period of time prior to a time, at which the still image capture signal is received, from the captured motion picture, that is, a captured image sequence. In other words, a frame corresponding to a time, which is calculated by subtracting a sum of time delays from the time at which the still image capture signal is received, is extracted. Next, the camera converts the extracted frame to an image file of a predetermined format. If there is no frame corresponding to a time, which is calculated by subtracting a sum of time delays from a time at which the camera has received the still image capture signal, a frame captured at a nearest time is extracted. A sum of time delays corresponds to a sum of a period of time elapsed for motion picture encoding operation in the camera, a period of time elapsed for transmitting the encoded motion picture from the camera to the remote controller, a period of time elapsed for motion picture decoding operation in the remote controller, and a period of time elapsed for transmitting a still image capture signal from the remote controller to the camera.

In step 660, the camera transmits the converted image file to the remote controller. Image files converted by the camera or the remote controller are transmitted via e-mail as described above in FIG. 2. The present embodiment may also employ M-JPEG format for capturing motion picture, and, when of transmitting a motion picture from the camera to the remote controller, the motion picture may be encoded to a motion picture of a lower resolution and the encoded motion picture may be transmitted to the remote controller.

Figure 7:
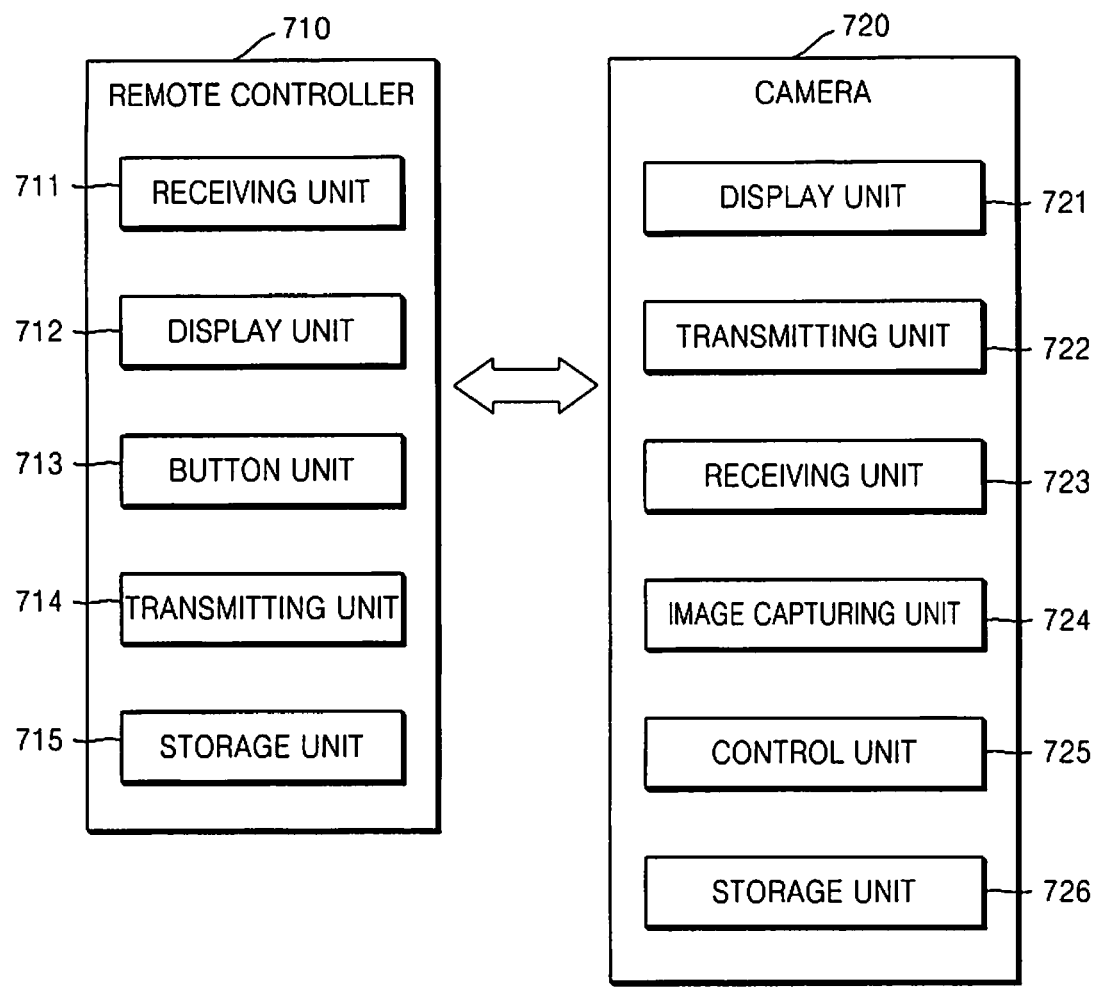
FIG. 7 is a block diagram of a camera 720 and a remote controller 710 of the camera, according to an embodiment of the present invention.

FIG. 7 is a block diagram of a camera 720 and a remote controller 710 of the camera, according to an embodiment of the present invention.

Referring to FIG. 7, the remote controller 710 includes a receiving unit 711, a display unit 712, a button unit 713, a transmitting unit 714, and a storage unit 715. The camera 720 includes a display unit 721, a transmitting unit 722, a receiving unit 723, an image capturing unit 724, a control unit 725, and a storage unit 726.

The receiving unit 711 of the remote controller 710 receives image signals, which are generated by encoding a screen image displayed on the display unit 721 of the camera 720 and are streamed to the remote controller 710 in real time.

The remote controller 710 decodes the image signals streamed from the camera 720 in real time at a decoding unit (not shown) and displays the decoded image signals on the display unit 712 of the remote controller 710. In this case, a time delay occurs, due to the encoding operation in the camera 720, transmission from the camera 720 to the remote controller 710, and the decoding operation in the remote controller 710. Therefore, a screen image displayed on the display unit 721 of the camera 720 and a screen image displayed on the display unit 712 of the remote controller 710 are not exactly the same. In other words, a screen image displayed on the display unit 712 of the remote controller 710 becomes a past screen image with respect to a screen image displayed on the display unit 721 of the camera 720, due to a sum of the time delays stated above. For example, if a user captures an image based on a screen image displayed on the display unit 712 of the remote controller 710, the captured image corresponds to a screen image a time displayed a time delay after the screen image viewed by the user. In this case, a user may not be able to acquire an image of a desired screen image.

The button unit 713 generates a successive image capture start signal and a successive image capture end signal for the camera 720. According to an embodiment of the present invention, the button unit 713 may generate a successive image capture start signal when the button unit 713 is pushed, whereas the button unit 713 may generate a successive image capture end signal when the button unit 713 is held and released.

The transmitting unit 714 of the remote controller 710 transmits a successive image capture start signal and a successive image capture end signal to the camera 720.

Furthermore, the receiving unit 711 of the remote controller 710 receives an image captured at a time, which is calculated by subtracting a sum of time delays from a time at which the camera 720 has received the successive image capture end signal. A sum of time delays corresponds to a sum of a period of time elapsed for transmitting a successive image capture start signal and a successive image capture end signal from the remote controller 710 to the camera 720, a period of time elapsed for encoding operation in the camera, a period of time elapsed for streaming a screen image from the camera to the remote controller, and a period of time elapsed for decoding operation in the remote controller.

The storage unit 715 of the remote controller 710 stores the received image. Furthermore, the storage unit 715 may store an address book as described below.

The display unit 721 of the camera 720 displays an image generated by converting light input via a lens (not shown) of the camera 720 to electric signals.

An encoding unit (not shown) of the camera 720 encodes the image displayed on the display unit 721 of the camera 720 by using a predetermined encoding method. Next, the transmitting unit 722 of the camera 720 streams encoded image signals to the remote controller 710 in real time. Furthermore, according to another embodiment of the present invention, if a successive image capture start signal is received, the encoding unit (not shown) of the camera 720 may encode an image to be streamed in real time to a resolution lower than that of a resolution of the image to be streamed in real time and transmit the encoded image to the remote controller 710. In this case, the time delay due to encoding operation in the camera, transmission, and decoding operation in the remote controller may be reduced, due to stream signals of a low resolution.

The camera 720 receives a successive image capture start signal or a successive image capture end signal from the remote controller 710.

The image capturing unit 724 starts to successive capture images when the successive image capture start signal is received and terminates to successively capture images when the successive image capture end signal is received. The successive image capture is a function of successively capturing images when a shutter button is pushed. A speed of successively capturing images may vary according to performance of the camera. According to an embodiment of the present invention, a time interval for successively capturing images may be smaller than a sum of time delays. Successively captured images respectively include information regarding time points at which the images are captured.

When a successive image capture end signal is received via the receiving unit 723 of the camera 720, the control unit 725 terminates the operation of successively capturing images and selects a predetermined image to be stored from among successively captured images. The control unit 725 selects an image captured at a time, which is calculated by subtracting a sum of the time delays from a time at which the camera has received the successive image capture end signal. In this case, an image identical to a screen image desired by a user may be acquired. If no image is captured at a desired time, which is calculated by subtracting a sum of the time delays from a time at which the camera has received the successive image capture end signal, the control unit 725 selects an image captured at a nearest time as an image to be stored. Furthermore, the control unit 725 may select a plurality of images captured within a predetermined time interval from the desired time as images to be stored. The camera may select all of successively captured images, so that a user may select images to store. The sum of time delays corresponds to a sum of a period of time elapsed for encoding operation in the camera 720, a period of time elapsed for streaming a screen image from the camera 720 to the remote controller 710, a period of time elapsed for decoding operation in the remote controller 710, and a period of time elapsed for transmitting a signal from the remote controller 710 to the camera 720. The storage unit 726 of the camera 720 stores captured images. The transmitting unit 722 of the camera 720 transmits the selected image to the remote controller 710. The control unit 725 of the camera 720 may transmit the selected image via the transmitting unit 722 of the camera 720 via e-mail based on information in an address book stored in the storage unit 726 of the camera 720.

Furthermore, because the camera 720 includes a face detection/recognition module, if a captured image is a portrait picture, the control unit 725 of the camera 720 may detect information of a person photographed in the captured image. In this case, the control unit 725 of the camera 720 may transmit a selected image to a person corresponding to the information detected in the image via the transmitting unit 722 of the camera 720 via e-mail based on the address information in the address book. If no address is stored in the storage unit 726 of the camera 720, the control unit 725 of the camera 720 may request address information to the remote controller 710, receive the address information, and transmit the selected image via e-mail based on the address information.

Furthermore, if the remote controller 710 receives a selected image, the remote controller 710 may also transmit the received image via e-mail based on information in an address book stored in the storage unit 715 of the remote controller 710. If the remote controller 710 includes a face detection/recognition module, the remote controller 710 may transmit the received image to a person corresponding to the information detected in the image as described above via e-mail based on information in the address book.

A camera and a remote controller of the camera according to another embodiment of the present invention will be described below.

The receiving unit 711 of the remote controller 710 receives an image, which is generated by encoding a screen image displayed on the display unit 721 of the camera 720 and is streamed in real time.

The remote controller 710 decodes the image streamed in real time by using a decoding unit (not shown) and displays the decoded image on the display unit 712 of the remote controller 710.

The button unit 713 generates a first image capture signal and a second image capture signal by using a predetermined button.

The transmitting unit 714 of the remote controller 710 transmits a first image capture signal and a second image capture signal to the camera 720.

Furthermore, the receiving unit 711 of the remote controller 710 receives a selected JPEG image from the camera 720.

The display unit 721 of the camera 720 displays an image generated by converting light input via a lens (not shown) of the camera 720 to electric signals.

An encoding unit (not shown) of the camera 720 encodes the image displayed on the display unit 721 of the camera 720 by using a predetermined encoding method. Next, the transmitting unit 722 of the camera 720 streams the encoded image to the remote controller 710 in real time. If the camera 720 receives the first image capture signal from the remote controller 710, the encoding unit (not shown) of the camera 720 switches a current method of encoding an image to a M-JPEG encoding method. The M-JPEG encoding method encodes each of frames to JPEG, and is an image compression technique developed from the JPEG compression method, which is a compression method for a still image. During M-JPEG compression, each of frames constituting an image is encoded to JPEG and is successively arranged to form a motion picture. A JPEG image is stored in a temporary memory (not shown).

The receiving unit 723 of the camera 720 receives a first image capture signal and a second image capture signal from the remote controller 710.

If the second image capture signal is received, the control unit 725 selects a predetermined JPEG image from among temporarily stored JPEG image, the predetermined JPEG image captured at a time, which is calculated by subtracting a sum of the time delays from a time at which the camera has received the second image capture signal. If JPEG no image is captured at a desired time, which is calculated by subtracting a sum of the time delays from a time at which the camera has received the second image capture signal, the control unit 725 selects a JPEG image captured at a nearest time point. The sum of time delays corresponds to a sum of a period of time elapsed for M-JPEG encoding operation in the camera 720, a period of time elapsed for streaming a screen image from the camera 720 to the remote controller 710, a period of time elapsed for M-JPEG decoding operation in the remote controller 710, and a period of time elapsed for transmitting the second image capture signal from the remote controller 710 to the camera 720.

The transmitting unit 722 of the camera 720 transmits the selected JPEG image to the remote controller 710. A JPEG image selected by the camera 720 or the remote controller 710 is transmitted via e-mail as described above.

A camera and a remote controller of the camera according to another embodiment of the present invention will be described below.

The button unit 713 generates a motion picture capture start signal and a still image capture signal by using a predetermined button.

The transmitting unit 714 of the remote controller 710 transmits the motion picture capture start signal and the still image capture signal to the camera 720. The receiving unit 711 of the remote controller 710 receives a real time stream of a captured motion picture from the camera 720.

The remote controller 710 decodes the motion picture streamed in real time by using a decoding unit (not shown) and displays the decoded motion picture on the display unit 712 of the remote controller 710.

Furthermore, the receiving unit 711 receives an image file, which is generated by converting a frame corresponding to a time which is a predetermined period of time prior to a time in a captured image sequence, from the camera 720.

If a motion picture capture start signal is received via the receiving unit 723 of the camera 720, the image capturing unit 724 of the camera 720 displays an image, which is generated by converting light input via a lens (not shown) of the camera 720 to electric signals, on the display unit 721 of the camera 720.

An encoding unit (not shown) of the camera 720 encodes the image displayed on the display unit 721 of the camera 720 by using a predetermined encoding method. Next, the transmitting unit 722 of the camera 720 streams the encoded image to the remote controller 710 in real time.

If the still image capture signal is received via the receiving unit 723 of the camera 720, the control unit 725 extracts a frame corresponding to a time which is a predetermined period of time prior to a time, at which the still image capture signal is received, from the captured motion picture, that is, a captured image sequence. In other words, the control unit 725 extracts a frame corresponding to a time, which is calculated by subtracting a sum of time delays from the time at which the still image capture signal is received, and converts the extracted frame to a predetermined image file. If there is no frame corresponding to a time, which is calculated by subtracting a sum of time delays from a time at which the camera has received the still image capture signal, a frame captured at a nearest time is extracted. A sum of time delays corresponds to a sum of a period of time elapsed for motion picture encoding operation in the camera 720, a period of time elapsed for transmitting the encoded motion picture from the camera 720 to the remote controller 710, a period of time elapsed for motion picture decoding operation in the remote controller 710, and a period of time elapsed for transmitting a still image capture signal from the remote controller 710 to the camera 720.

The transmitting unit 722 of the camera 720 transmits the converted image file to the remote controller 710. An image file converted by the camera 720 or the remote controller 710 is transmitted via e-mail as described above.

The invention can also be embodied as computer readable codes on a computer readable recording medium. The computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although the present invention has been particularly shown and described with reference to preferred embodiments thereof, it will be understood by those skilled in the art that various changes in form and detail may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing an image of an image capture apparatus, the method comprising:
   receiving, from a remote device executing an application to remotely control the image capture apparatus to provide a still image to the remote device, a first input to initiate capturing a sequence of images to the remote device if a shutter icon of the remote device is touched;
   initiating capturing the sequence of images in response to receiving the first input;

transmitting the sequence of images to the remote device while touch input regarding the shutter icon is maintained;
receiving, from the remote device, a second input instructing the image capture apparatus to stop capturing the sequence of images if the touch input regarding the shutter icon is released;
stopping capturing the sequence of images, in response to receiving the second input;
determining a period of time prior to a time of receiving the second input from the remote device;
automatically selecting the still image from the sequence of images captured during the period of time prior to the time of receiving the second input from the remote device based on a sum of time delays from a time at which the second input is received from the remote device, wherein the time delays include a time delay of an encoding operation in the image capture apparatus, and wherein the determined period of time is a part of a time period between a time of receiving the first input from the remote device and the time of receiving the second input from the remote device; and
outputting the still image.

2. The method of claim 1, wherein the sequence of images is captured while the shutter icon of the remote device is touched.

3. The method of claim 1, further comprising:
determining the time of receiving the second input from the remote device, and the outputting comprises outputting the still image based on the time of receiving the second input from the remote device.

4. The method of claim 1, wherein the outputting comprises:
transmitting the still image by email to a destination email address.

5. The method of claim 4, wherein the transmitting comprises:
obtaining the destination email address; and
transmitting the still image by email to the destination email address.

6. The method of claim 1, wherein the capturing the sequence of video frames comprises:
storing the sequence of images in a memory of the image capture apparatus.

7. The method of claim 1, wherein the transmitting comprises:
encoding the sequence of images to a lower resolution lower than a resolution at which the sequence of images is captured; and
streaming the sequence of images having the lower resolution to the remote device.

8. A non-transitory computer-readable medium having embodied thereon a program that causes a mobile device to provide an image of an image capture apparatus, the method comprising:
executing an application to remotely control the image capture apparatus to provide a still image to the mobile device;
transmitting to the image capture apparatus a first signal to initiate capturing a sequence of images to the mobile device if a shutter icon of the mobile device is touched;
receiving the sequence of images from the image capture apparatus, in response to transmitting the first signal;
detecting a release of the shutter icon of the mobile device;
transmitting a second signal to the image capture apparatus instructing the image capture apparatus to stop capturing the sequence of images, in response to detecting the release of the shutter icon of the mobile device;
receiving the still image from the image capture apparatus automatically selected based on a sum of time delays from a time at which the second signal is received from the mobile device, wherein the time delays include a time delay of an encoding operation in the in the image capture apparatus and selected from the sequence of images captured during a period of time prior to a time of transmitting the second signal, in response to transmitting the second signal, wherein the period of time is a part of a time period between a time the shutter icon of the mobile device is touched and a time of the release of the shutter icon of the mobile device; and
outputting the still image.

9. The non-transitory computer-readable medium of claim 8, wherein the sequence of images is captured while the shutter icon of the mobile device is touched.

10. The non-transitory computer-readable medium of claim 8, wherein the still image is selected based on a time of transmitting the second signal.

11. The non-transitory computer-readable medium of claim 8, wherein the outputting comprises:
obtaining a destination email address; and
transmitting the still image by email to the destination email address.

12. The non-transitory computer-readable medium of claim 8, wherein the transmitting the first signal comprises detecting a touch of the shutter icon of the mobile device.

13. The non-transitory computer-readable medium of claim 8, wherein the sequence of images is stored in a memory of the image capture apparatus.

14. The non-transitory computer-readable medium of claim 8, wherein the received sequence of images is an encoded sequence of images of a lower resolution lower than a resolution at which the sequence of images is captured.

15. A mobile device comprising:
a transmitting unit configured to transmit to an image capture apparatus a first signal to initiating capturing a sequence of images to the mobile device if a shutter icon of the mobile device is touched;
a receiving unit configured to receive the sequence of images from the image capture apparatus, in response to the transmitting unit transmitting the first signal; and
an output unit configured to output a still image,
wherein the transmitting unit is configured to transmit a second signal to the image capture apparatus instructing the image capture apparatus to stop capturing the sequence of images, in response to detection of a release of a shutter icon of the mobile device,
wherein the receiving unit is configured to receive the still image automatically selected based on a sum of time delays from a time at which the second signal is received from the mobile device, wherein the time delays include a time delay of an encoding operation in the image capture apparatus and selected from the sequence of images captured during a period of time prior to a time of transmitting the second signal from the image capture apparatus, in response to the transmitting unit transmitting the second signal, wherein the period of time is a part of a time period between a time the shutter icon of the mobile device is touched and a time of the release of the shutter icon of the mobile device, wherein the mobile device executes an application to remotely control the image capture apparatus to provide the still image to the mobile device.

16. The mobile device of claim 15, wherein the sequence of images is captured while the shutter icon of the mobile device is touched.

17. The mobile device of claim 15, wherein the still image is selected based on the time of transmitting the second signal.

18. The mobile device of claim 15, wherein the mobile device is configured to obtain a destination email address and transmit the still image by email to the destination email address.

19. The mobile device of claim 15, wherein the sequence of images is stored in a memory of the image capture apparatus.

20. The mobile device of claim 15, wherein the received sequence of images is an encoded sequence of images of a lower resolution lower than a resolution at which the sequence of images is captured.

21. An image capture apparatus comprising:
a receiving unit configured to receive, from a remote device executing an application to remotely control the image capture apparatus, a first input to initiate capturing a sequence of images to the remote device if a shutter icon of the remote device is touched;
an image capturing unit configured to initiate capturing the sequence of images in response to receiving the first input; and
a transmitting unit configured to transmit the sequence of images to the remote device while the touch input regarding the shutter icon is maintained,
wherein the receiving unit is configured to receive, from the remote device, a second input instructing the image capture apparatus to stop capturing the sequence of images if the touch input regarding the shutter icon is released,
wherein the image capturing unit is configured to stop capturing the sequence of images, in response to the receiving unit receiving the second input,
wherein the transmitting unit is configured to determine a period of time prior to a time of receiving the second input from the remote device, and automatically select the still image from the sequence of images captured during the period of time prior to the time of receiving the second input from the remote device based on a sum of time delays from a time at which the second input is received from the remote device, wherein the time delays include a time delay of an encoding operation in the image capture apparatus and wherein the determined period of time is a part of a time period between a time of receiving the first input from the remote device and the time of receiving the second input from the remote device, and output the still image.

22. The image capture apparatus of claim 21, wherein the sequence of images is captured while the shutter icon of the remote device is touched.

23. The image capture apparatus of claim 21, wherein the transmitting unit is configured to determine the time of receiving the second input from the remote device and select the still image based on the time of receiving the second input from the remote device.

24. The image capture apparatus of claim 21, wherein the transmitting unit is configured to transmit the still image by email to a destination email address.

25. The image capture apparatus of claim 24, wherein the transmitting unit is configured to provide the still image by obtaining the destination email address and transmitting the still image by email to the destination email address.

26. The image capture apparatus of claim 21, wherein the image capture unit is further configured to capture the sequence of images by storing the sequence of images in a memory of the image capture apparatus.

27. The image capture apparatus of claim 21, wherein the transmitting unit is configured to stream the sequence of images by encoding the sequence of images to a lower resolution lower than a resolution at which the sequence of images is captured and streaming the sequence of images having the lower resolution to the remote device.

* * * * *